Oct. 13, 1953    E. K. BUYZE    2,655,230
DISK BRAKE MECHANISM
Filed July 3, 1951    5 Sheets-Sheet 1

INVENTOR.
Edwin K. Buyze
BY
Maurice A. Crews
ATTORNEY

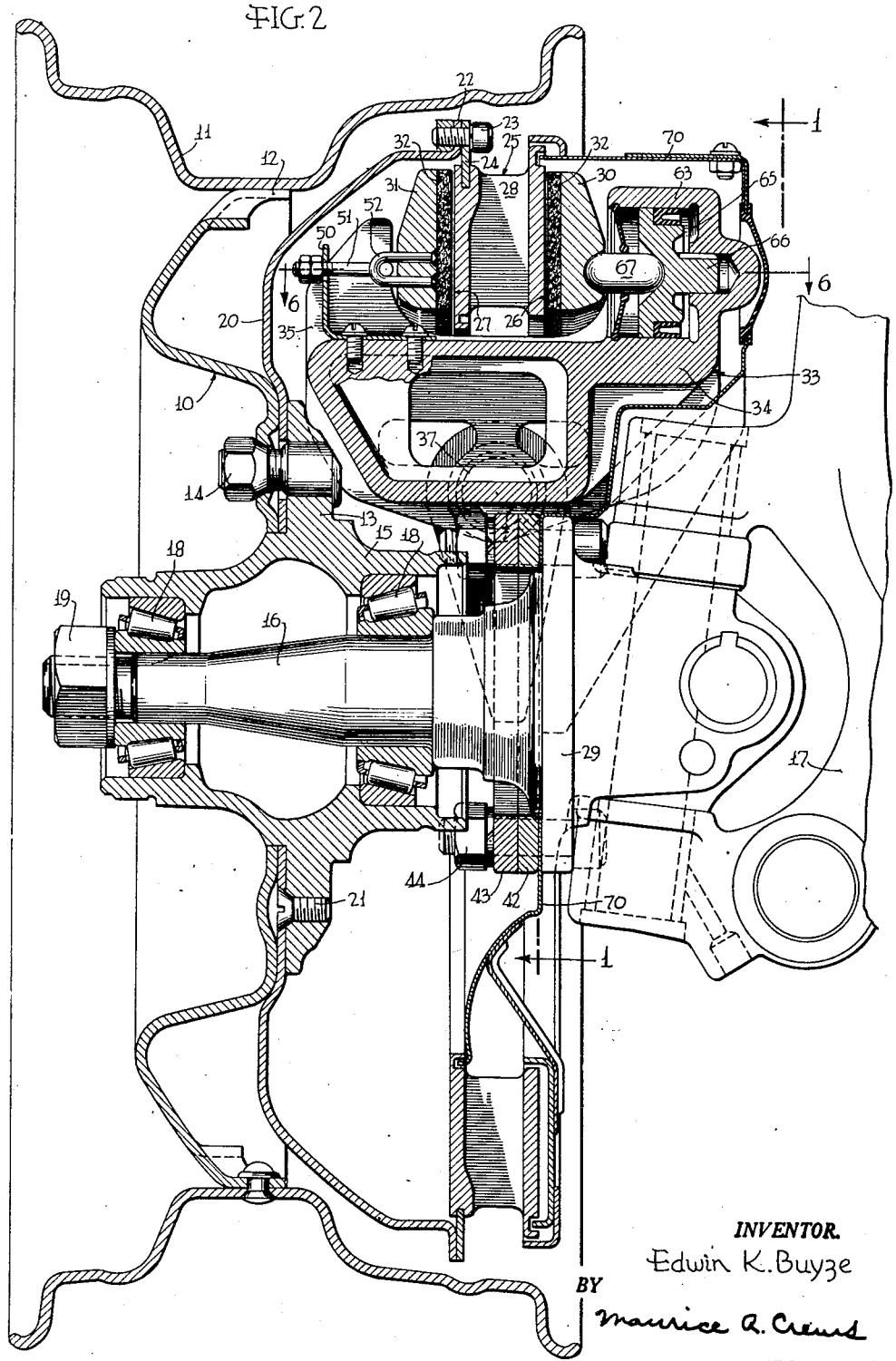

Oct. 13, 1953
E. K. BUYZE
2,655,230
DISK BRAKE MECHANISM
Filed July 3, 1951
5 Sheets-Sheet 3
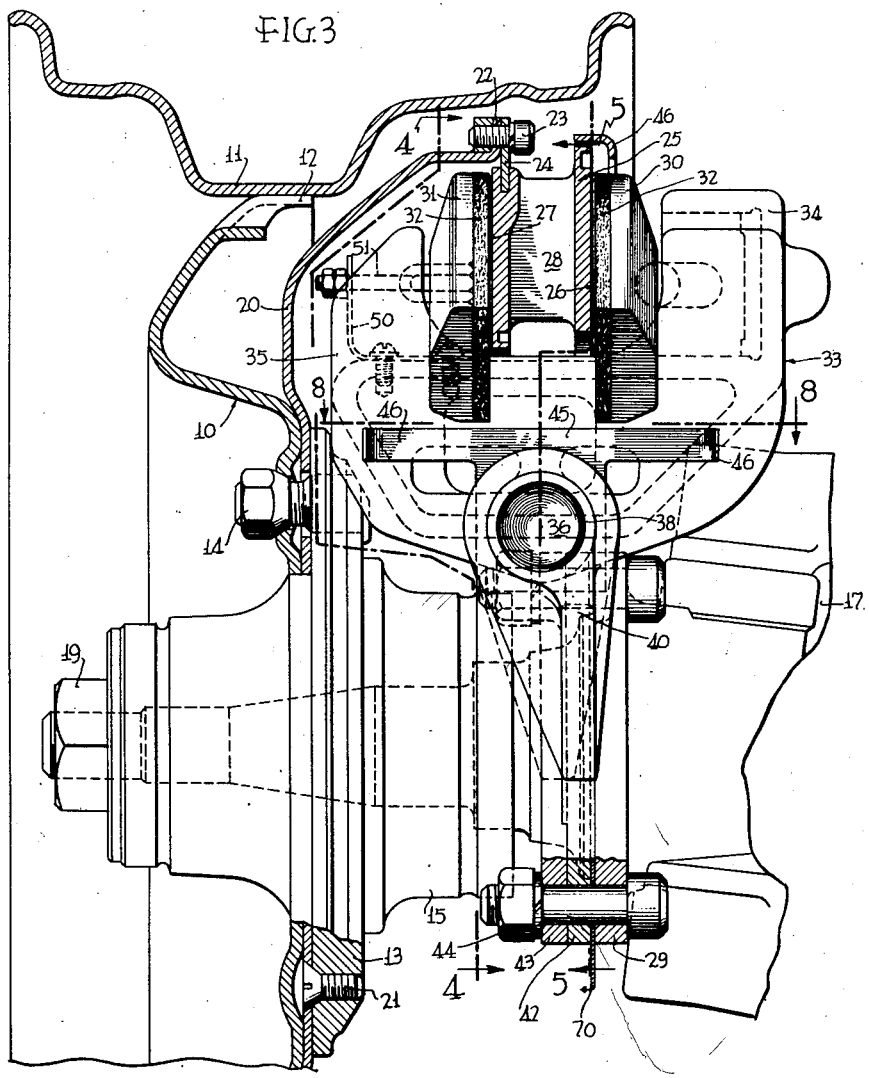
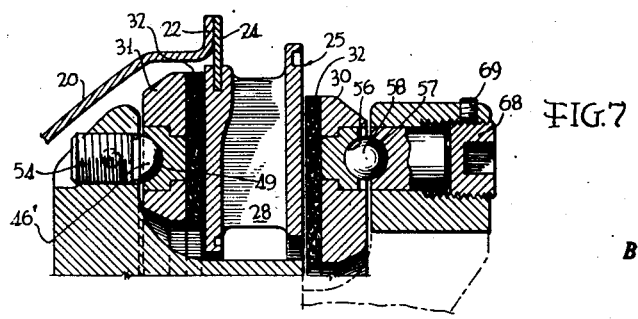
INVENTOR.
Edwin K. Buyze
BY
Maurice A. Crews
ATTORNEY Oct. 13, 1953   E. K. BUYZE   2,655,230
DISK BRAKE MECHANISM
Filed July 3, 1951   5 Sheets-Sheet 4

INVENTOR.
Edwin K. Buyze
BY
ATTORNEY

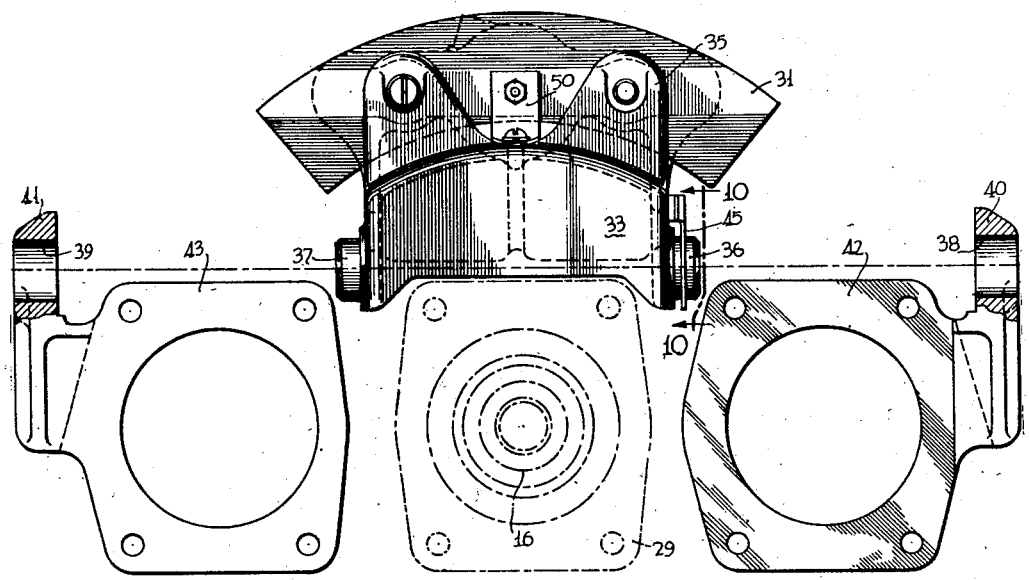
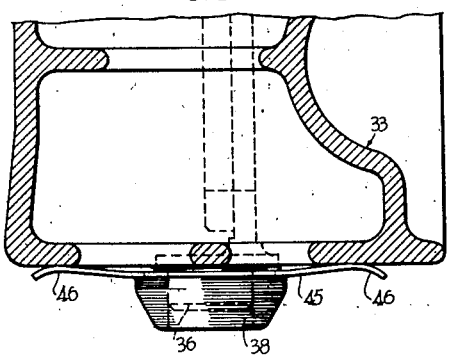
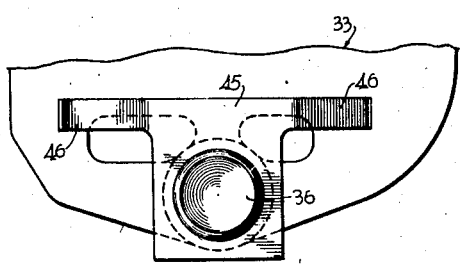
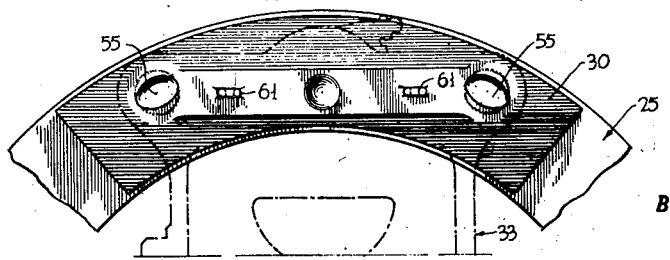

Patented Oct. 13, 1953

2,655,230

UNITED STATES PATENT OFFICE 2,655,230

DISK BRAKE MECHANISM

Edwin K. Buyze, St. Clair Shores, Mich., assignor to The Budd Company, Philadelphia, Pa., a corporation of Pennsylvania Application July 3, 1951, Serial No. 234,957

5 Claims. (Cl. 188—72)

The invention relates to a brake mechanism and more particularly to a brake mechanism of the disc-type adapted for use in automotive vehicles.

It embodies a brake mechanism generally similar to that disclosed in copending application Serial No. 209,235, filed February 3, 1951, and entitled "Disc Brake Mechanism," and relates to certain improved constructions in a brake mechanism of the type shown in that application.

The present invention relates more particularly to the mounting of the relatively stationary brake mechanism of a brake of the general class shown in said copending application, it being a principal object to simplify the mounting, to facilitate the assembly of the brake mechanism, and increase the overall strength while maintaining a minimum of weight in a brake mechanism of this general class.

These and other and further objects and the manner in which they are attained will become apparent from the following detailed description when read in connection with the drawings forming a part of this specification.

In the drawings:

Fig. 2 is an enlarged sectional view of the brake mechanism in association with a front wheel of an automotive vehicle, the section being taken substantially along the line 2—2 of Fig. 1;

Fig. 3 is an elevational view similar to Fig. 2, but with most of the brake mechanism shown in outside elevation, and other parts broken away and shown in section;

Fig. 7 is a detail sectional view taken substantially along the line 7—7 of Fig. 6;

Fig. 8 is a detail sectional view taken substantially along the line 8—8 of Fig. 3;

Fig. 9 is an exploded view of the parts mounting the brake mechanism, showing them in position for assembly with the wheel spindle flange shown by dot-and-dash lines in this view;

Fig. 10 is a detail elevational view taken along the line 10—10 of Fig. 9; and

Fig. 11 is a fragmentary elevational view of the inner brake shoe and associated parts.

Figure 1:
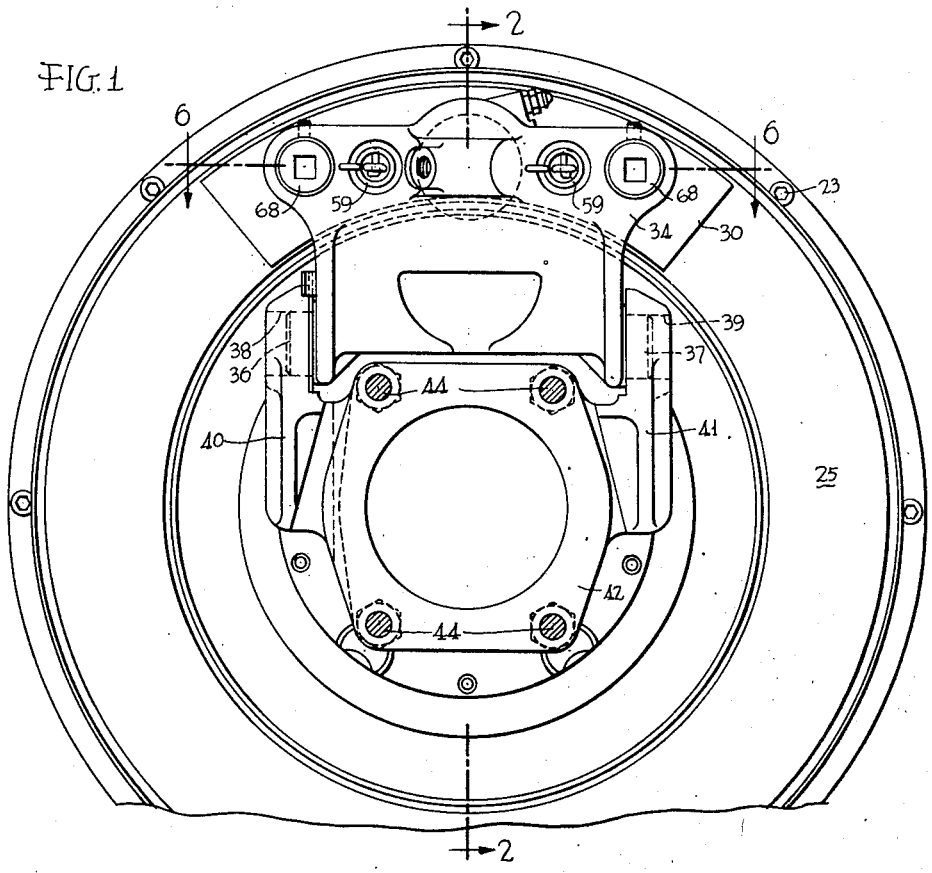
Fig. 1 is an inside elevational view of a brake mechanism according to the invention and adapted to be applied to an automotive vehicle; the parts being shown as seen from the line 1—1 of Fig. 2, with the cover removed.

In the drawings, the brake mechanism embodying the invention has been shown associated with a front wheel of an automobile, but it will be understood that it is equally applicable to a rear wheel or in other relations, if desired.

Referring now to Figs. 2 and 3, the wheel body designated 10 is a usual form of disc wheel body having a drop center rim 11 seated on and secured in a usual manner to the peripheral flange 12 of the wheel body. The wheel is removably mounted on the hub flange 13 by an annular series of bolts, as 14. The hub barrel 15 is rotatably mounted on the spindle 16 of the front axle 17 through the anti-friction bearings 18. By removing the securing nut 19 at the end of the spindle, the hub bearings and wheel may be removed outwardly from the spindle, providing ready access for the assembly and disassembly of the brake mechanism hereinafter described.

The rotating element, or rotor, of the improved brake mechanism comprises a dished supporting plate 20 seated, in this embodiment, against the outer face of the hub flange 13 and held in place by screws, as 21, and the wheel securing bolts 14.

The outer periphery of the supporting plate is formed with a radially outwardly extending flange 22, and to this flange is secured, as by the bolts and nuts 23, a sheet metal annulus 24, which carries cast thereon a usual form of ventilated cast iron brake ring 25 having opposed inboard and outboard radially extending braking faces 26 and 27, respectively, and the brake cooling passages 28 therebetween. The deep dish of the supporting plate 20 of the rotor and the location of the braking ring 25 adjacent the rim leaves ample space radially inwardly between the brake ring and a flange 29 adjacent the inner end of the spindle 16, in the case of a front wheel, or a corresponding flange of the fixed axle housing, in the case of a rear wheel, for the disposition of the stationary brake mechanism and its support, which are associated with the rotary brake element or rotor just described.

The stationary brake mechanism comprises the segmental opposed inboard and outboard shoes 30 and 31, respectively, each carrying a suitable brake lining, as 32; the shoes being disposed at the top and in cooperative relation with the opposed braking faces 26 and 27 of the rotary brake ring 25. In the present embodiment, the shoes have an angular extent of less than 90°, so that large portions of the braking faces of the rotor are at all times subject to the cooling action of the air flowing past them.

The mounting of the shoes is such as to permit the application of equalized pressure over the entire face of the lining and between it and the associated braking face, and this, together with the extensive surfaces of the rotor exposed to cooling air, avoids overheating of any portion of the brake and the resultant development of heat checks in the rotor.

The shoes 30 and 31 are directly supported in a manner generally similar to that shown in the copending application hereinbefore referred to, i. e., they are carried by an outer support member 33 which, as clearly appears in the drawings, is an integral cored casting of substantially U- or C-form, the arms 34 and 35 of which embrace the backs of the respective shoes 30 and 31 and serve as mounting means therefor and the bight of which carries, substantially centrally thereof, the spaced fore and aft extending trunnions 36 and 37.

An important feature of the invention resides in the manner of mounting of the U-form member 33 carrying the shoes on a relatively fixed support, such as the flange 29 of the spindle 16, so that the parts can be readily assembled and disassembled, and when assembled provide a strong connection of the U-member 33 to the fixed support enabling it to readily carry the torque strains due to braking.

To this end, cylindrical bearings 38 and 39 arranged to receive the respective trunnions 36 and 37 are provided in ears 40 and 41 forming integral extensions of flat plates 42 and 43, respectively. These plates 42 and 43 have enlarged central openings to freely receive the spindle 16, and are strongly secured in their flat overlapping portions to the spindle flange 29 or other fixed support, as by an annular series of bolts 44. Fig. 9 clearly shows the parts prior to assembly, the dot-and-dash lines indicating the spindle 16 and spindle flange 29, and the bearing carrying plates 42 and 43 being in lateral alignment with the trunnions 36 and 37 on the U-form member 33. Inward movement of the plates into overlapping relation with each other slides the bearings over the respective trunnions, after which the assembly is moved axially inwardly over the spindle, while the hub and wheel are demounted, and secured in place by the bolts 44. Similarly the brake mechanism can be readily dismounted, following the removal of the wheel and hub and associated parts. It will be understood, of course, that the bolts 23 are first released before the removal of the hub and wheel.

To prevent undesired oscillation of the member 33 on the trunnions after assembly, a leaf spring, as 45 (see Figs. 3, 9, and 10) may be slipped over one of the trunnions, this spring being tensioned by the assembly of the bearings with the trunnions and frictionally bearing through its arms 46, 46 against the adjacent side of the member 33 to oppose its free pivoting on the trunnions.

Figure 6:
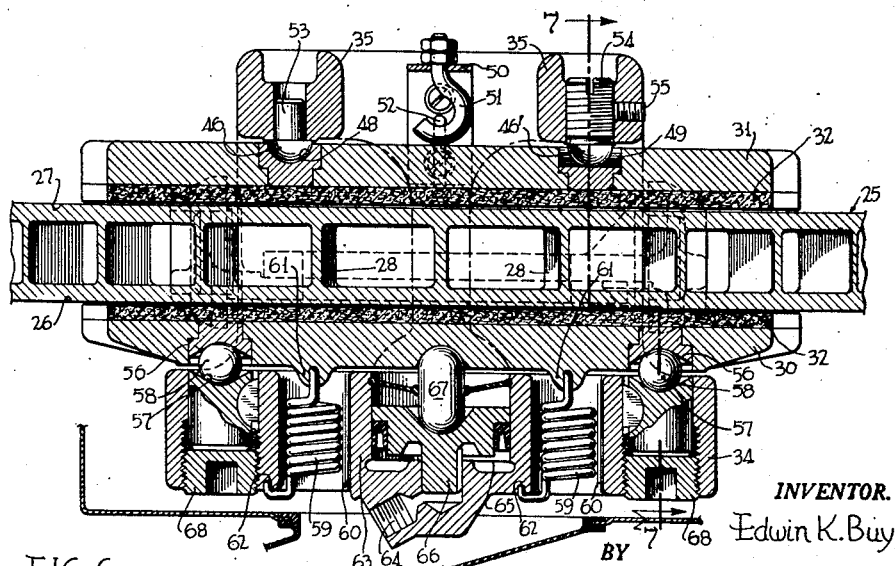
Fig. 6 is a sectional view taken substantially along the line 6—6 of Figs. 1 and 2.
Figure 4:
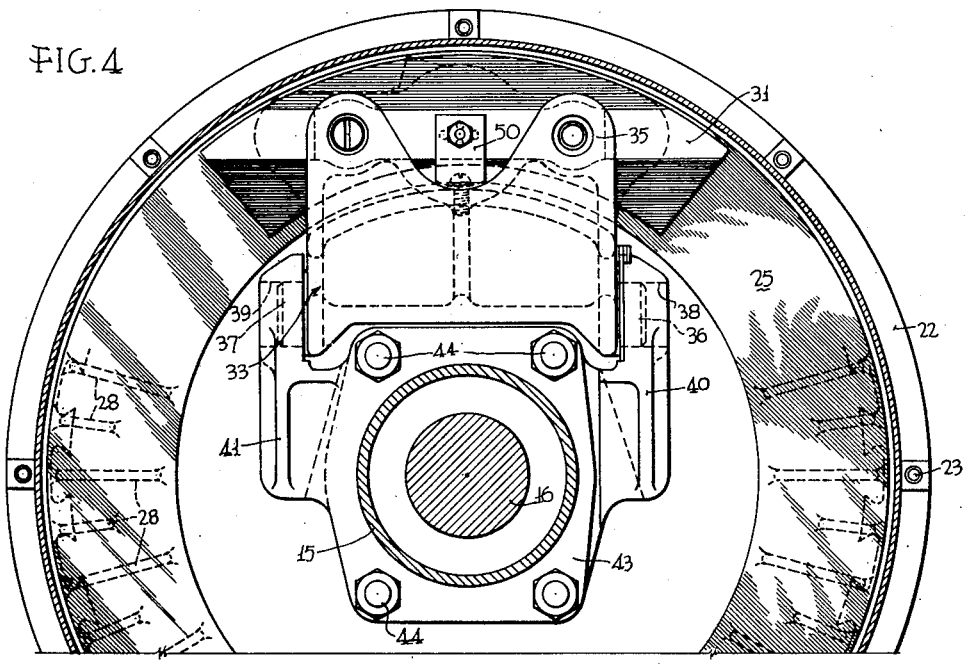
Fig. 4 is a sectional view taken substantially along the line 4—4 of Fig. 3.
Figure 5:
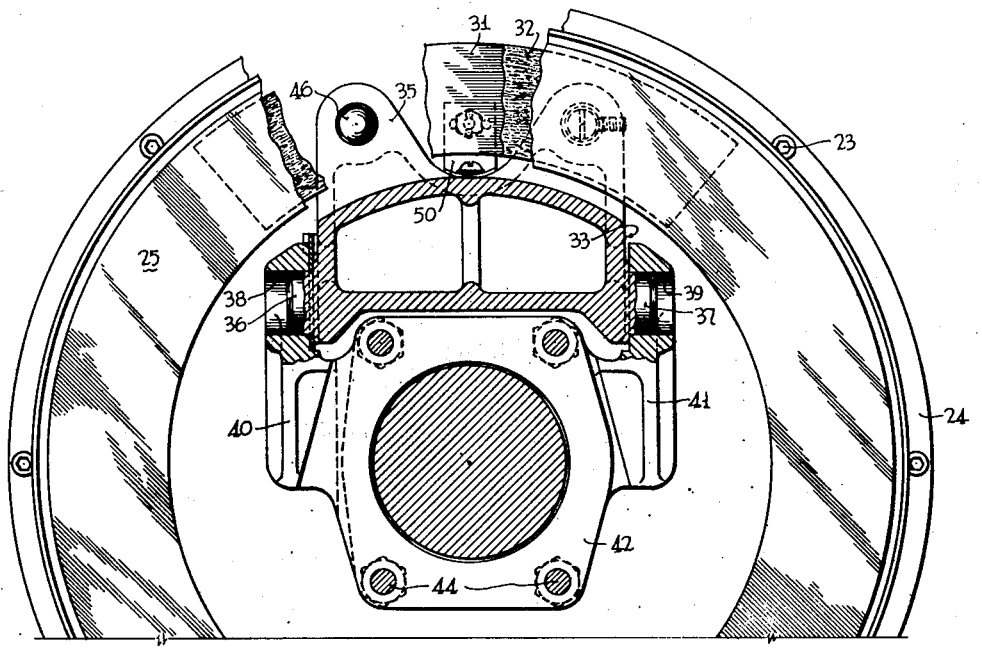
Fig. 5 is a similar view taken substantially along the line 5—5 of Fig. 3, and with parts broken away to more clearly show the parts behind them.

As in the hereinbefore referred to copending application, the shoes are pivotally mounted on the respective arms of the U-form member 33 in such manner that the pivotal axis lies in a plane normal to the respective shoe and divides the brake lining into substantially equal area parts disposed on opposite sides of said plane. For mounting the outboard shoe 31, spaced semi-spherical protuberances 46, 46' on arm 35, which is bifurcated as shown in Figs. 4, 5 and 6, engage recesses 48 and 49, respectively, on the back of the shoe 31. The shoe is yieldingly held in its mounted position by a flat, angular form spring strip 50, mounted through one arm (see Figs. 4 and 5) on the member 33 between the furcations of its arm 35. The free end of said spring strip is secured to the back of the shoe 31 through an adjustable length hook 51 and clevis 52, see Fig. 6. It will be seen that this provides a very easy mounting and dismounting of the shoe, because the hook may be readily disengaged or engaged.

The protuberances 46, 46' are preferably made as the heads of pins 53 and 54 fitting into openings in the respective furcations of the arm 35. Because of the spherical-faced mounting, the shoe can readily adjust itself about its longitudinal axis to bear evenly upon the adjacent face 27 of the rotor.

To insure that the shoe is in exact parallelism with the adjacent face 27 of the rotor, at least one of the pins, as 54, is made adjustable. This may be done by screw-threadedly fastening it into its opening, see Fig. 6, and locking it in adjusted position by a lock screw 55.

One of the pins, as 53, has its spherical head 46 fitting a corresponding spherical recess 48 in the shoe, but the pin 54 has its spherical head 46' seated in a cylindrical groove seat 49, see Fig. 6, in the shoe. This arrangement allows for lengthwise expansion or contraction of the shoe, without disturbing the ball seating of the protuberances in their respective recesses.

The inboard shoe 30 is mounted, as in the above referred to application, for movement away from the arm 34 of the U-form member 33 to effect the manually-controlled braking and also for pivotal movement about an axis lying in a plane normal to the shoe and dividing the brake lining into equal parts, as well as for slight circumferential or endwise movement of the shoe to effect a servo-action.

In the plane just referred to are arranged spaced pairs of opposed hardened cam seats, as 56 and 57, arranged respectively on the back of the shoe 30 and on the arm 34. The spaced cam seats receive a hardened ball, as 58, between them, and the shoe is held in normal position with the balls 58 centered between their respective cam seats by resilient means pressing the shoe against the balls.

Such resilient means are shown herein as tension springs 59 arranged adjacent the opposite ends of the shoe and passing through holes 60 freely receiving them in the arm 34. The end of the springs are hook-shaped and hooked, respectively, into perforated ears, as 61, on the shoe and into recesses 62 on the inboard face of the arm 34, Fig. 6.

For actuating the brake shoes into braking engagement, a hydraulic cylinder 63 is provided centrally of the arm 34 and shoe 30, this cylinder actuating the shoe when compressed fluid is admitted through port 64 into a chamber 65 behind the piloted piston 66 movable in the cylinder. The piston actuates the shoe through a short strut 67 having rounded ends engaging in mating rounded recesses in the piston and shoe, respectively.

With the arrangement just described, if the shoes are manually operated by causing compressed fluid to be admitted behind the piston to force the shoes toward each other, the braking will be initiated by the engagement of the shoe linings with the opposed faces of the brake rotor, but this initial braking will be greatly augmented by the servo-action which takes place due to the friction between the endwise movable shoe 30 and the adjacent braking face 26. This friction drag causes the shoe 30 to shift endwise and thereby causes the balls 58 to roll up their associated cams to force the shoes into still stronger engagement with the respective braking faces.

In such endwise movement of the shoe 30, the springs 59 are cocked and further tensioned, and upon release of the brakes they return the parts to the normal position shown in Fig. 6.

Cams 56 and 57 are respectively provided on hardened inserts which are non-rotatably secured in the shoe 30 and arm 34, respectively. The cam inserts on the arm 34 may be adjustably mounted thereon and may be adjusted for mounting the shoe in parallelism with the braking surface 26 or to take up wear by adjusting the screw-threaded plugs 68, one associated with each insert. After adjustment, they are locked in place by screw plugs, as 69, see Fig. 7.

The U-form shoe mounting member 33, because of its slight pivotal movement transversely to the plane of the rotor, allows the pressure on the opposed shoes to be equalized, but the spring 45, by its frictional engagement with the member 33 prevents it from flopping back and forth when the brakes are not applied.

A suitable cover or shield, designated generally by numeral 70, see Figs. 2 and 3, may be provided to protect the brake mechanism from dust and dirt.

The manner of assembly of the improved brake and its operation will now be briefly described.

The U-shaped support member 33 and the parts assembled therewith is first assembled (see Fig. 9) with the bearing carrying plates 42 and 43 by slipping the bearings 38 and 39 over the respective trunnions 36 and 37 and bringing the flat portions of the plates into overlapping engagement.

This assembly of member 33 and bearing carrying plates is then slipped axially over the spindle 16 while the hub and wheel are demounted and the plates are secured together and to the spindle flange 29 by the bolts 44. The brake ring 25 is then brought into position between the shoes. Finally, the hub with wheel and mounting plate 20 are assembled with the hub, after which the brake ring is secured to the mounting plate by the peripheral bolts 23.

In operation, the brake is initially applied by the operator causing compressed fluid, as by actuating a pedal, to enter the port 64 to actuate the piston 66 and move it laterally and thereby force the lining 32 of shoe 30 into engagement with the radial face 26 of the brake ring 25. Thereupon, further movement of the piston will rock the U-form member 33 on its trunnions 36 and 37 until the lining 32 of the other shoe 31 is brought into engagement with the opposed radial face 27 of the ring. Braking pressure will now be transmitted in balanced relation to the opposite faces of the ring. The frictional drag of the shoe 30 will then cause the shoe to rotate slightly with the rotor 25, and in such slight rotary movement the balls 58 will ride up the cams 56, 57 associated with the respective balls and increase the braking force materially over that due to the manually controlled fluid pressure.

Since the shoes 30, 31 are pivotally supported in planes normal to the respective shoes and dividing the area of the brake lining into substantially equal portions, the pressure on the rotary brake ring 25 will be equally distributed, and this minimizes the possibility of unduly heating localized areas and the likelihood of heat checking the brake ring.

When the hydraulic pressure is released by the operator, the springs 59, which were further tensioned by the slight rotation or endwise movement of shoe 30, return the parts to the starting position shown in Fig. 6.

While a specific form of the invention has been described herein in detail, it will be understood that changes and modifications may be made by those skilled in the art without departing from the spirit and scope of the invention as set forth in the appended claims.

What is claimed is:

1. In combination, a fixed support, a brake rotor having opposed braking faces, segmental shoes for cooperation with the respective faces, a movable support for the shoes comprising a member of integral U-form embracing the shoes and mounted for limited pivotal movement transversely to the plane of the rotor, said pivotal mounting comprising trunnions extending fore and aft of said member, and bearings for the respective trunnions carried by separate plates having overlapping parts secured by a common securing means to said fixed support.

2. In combination, a fixed support, a brake rotor, segmental shoes for cooperation therewith, a movable support for the shoes comprising a member of integral U-form embracing the shoes and mounted for pivotal movement transversely to the plane of the rotor, said pivotal mounting comprising trunnions extending fore and aft of said member, and a bearing for receiving each of said trunnions, said bearings being associated with separate mounting members having parts disposed in overlapping relation and secured through the overlap to said fixed support.

3. In combination, a fixed support, a brake rotor, brake shoes for cooperation therewith, a movable support for the shoes comprising a U-form member carrying the shoes and mounted for limited pivotal movement transversely of the plane of the rotor, said pivotal mounting comprising spaced trunnions on said member, a bearing receiving each of said trunnions, the bearings being associated with separate overlapping parts secured through the overlap to said fixed support.

4. In combination, a fixed support, brake mechanism including a rigid U-form member and brake shoes carried by the respective arms of the U, a brake rotor for cooperation with said shoes, said U-form member being mounted for limited transverse pivotal movement with respect to the rotor, said mounting comprising spaced trunnions extending, respectively, fore and aft of said member, and a pair of overlapping plate-like members, each carrying a bearing for receiving one of said trunnions, said plate-like member being secured in the overlap to said fixed support.

5. In combination, a fixed support, brake mechanism including a rigid U-form member and brake shoes carried by the respective arms of the U, a brake rotor for cooperation with said shoes, mounting means for said U-form member providing limited transverse pivotal movement thereof with respect to the rotor, said mounting means comprising spaced pivot sets, each including a trunnion element and a cooperating bearing element, one each of the elements of the said pivot sets being mounted on said U-form member and the other elements of said pivot sets being mounted respectively on separate parts having overlapping portions secured in the overlap to said fixed support.

EDWIN K. BUYZE.

References Cited in the file of this patent

UNITED STATES PATENTS

| Number | Name | Date |
|---|---|---|
| 1,855,629 | Heiney | Apr. 26, 1932 |
| 1,955,135 | Williams et al. | Mar. 19, 1935 |

FOREIGN PATENTS

| Number | Country | Date |
|---|---|---|
| 821,223 | France | Nov. 30, 1937 |